Figure 1:
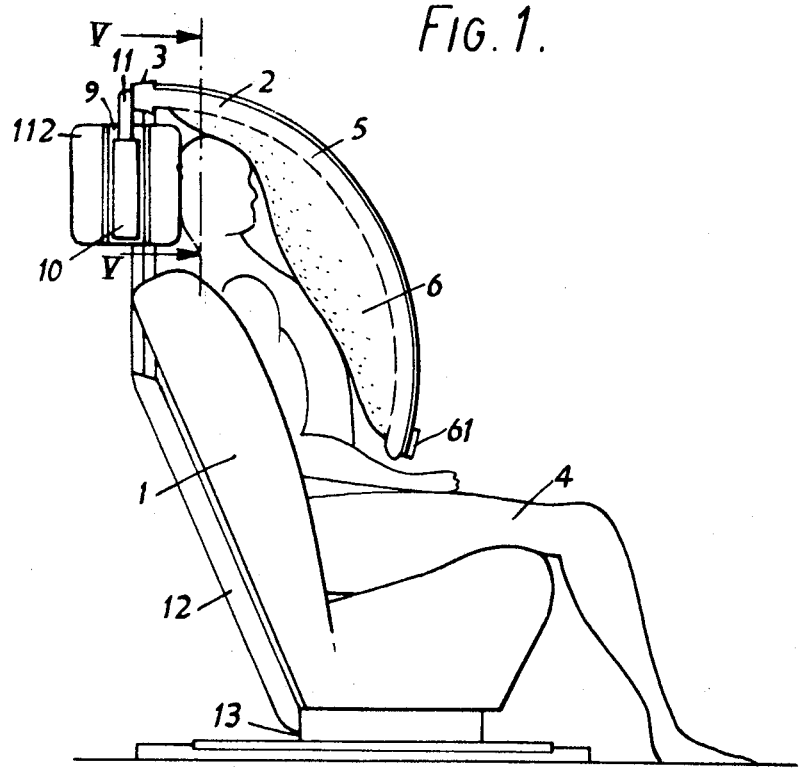

United States Patent [19]
Gorman

[11] 3,753,576
[45] Aug. 21, 1973

[54] VEHICLE SAFETY DEVICE

[76] Inventor: John F. Gorman, Corner Cottage The Street, Effingham, Surrey, England

[22] Filed: Sept. 29, 1971

[21] Appl. No.: 184,834

[52] U.S. Cl. ...... 280/150 AB, 128/DIG. 2, 297/390
[51] Int. Cl. ............................................. B60r 21/08
[58] Field of Search ............. 280/150 AB; 5/348 R; 128/DIG. 20; 182/137; 297/390

[56] References Cited
UNITED STATES PATENTS

| | | | |
|---|---|---|---|
| 3,675,942 | 7/1972 | Huber | 280/150 AB |
| 3,588,142 | 6/1971 | Gorman | 280/150 AB |
| 3,218,103 | 11/1965 | Boyce | 128/DIG. 20 |
| 3,582,107 | 6/1971 | Goetz et al. | 280/150 AB |
| 3,672,699 | 6/1972 | De Windt | 280/150 AB |
| 2,834,606 | 5/1958 | Bertrand | 280/150 AB |
| 2,806,737 | 9/1957 | Maxwell | 280/150 AB X |
| 3,603,430 | 9/1971 | Kendall et al. | 182/137 |
| 3,614,127 | 10/1971 | Glance | 280/150 AB |
| 3,663,037 | 5/1972 | Wohn-MacHowski | 280/150 B |
| 3,643,972 | 2/1972 | Caiati et al. | 280/150 B |
| 3,511,519 | 5/1970 | Martin | 280/150 AB |
| 3,606,377 | 9/1971 | Martin | 280/150 AB |
| 2,672,628 | 3/1954 | Spanel | 5/348 R |
| 3,377,082 | 4/1968 | Saunders | 280/150 B |

*Primary Examiner*—Kenneth H. Betts
*Assistant Examiner*—John P. Silverstrim
*Attorney*—Donald M. Wight et al.

[57] ABSTRACT

A vehicle safety device comprising an expandible composite element provided with a mounting for location in a vehicle and which is expandible from an inoperative retracted position to an operative expanded position, and means for rapidly filling the element with a filler material to cause the expansion, the element including an outer shield which expands first and an inner shield which extends inwardly therefrom the expansion of which is commenced after expansion of the first shield has started.

22 Claims, 16 Drawing Figures

Patented Aug. 21, 1973

3,753,576

6 Sheets-Sheet 1

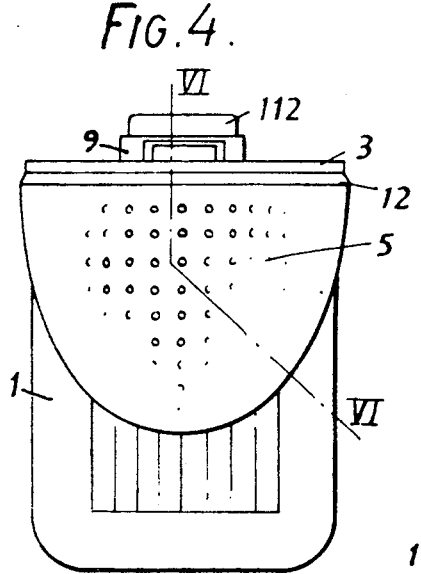
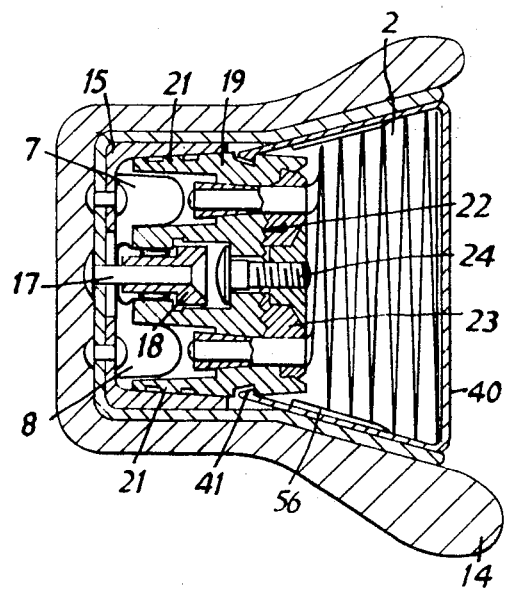
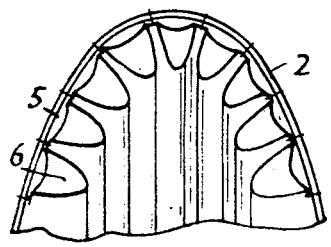
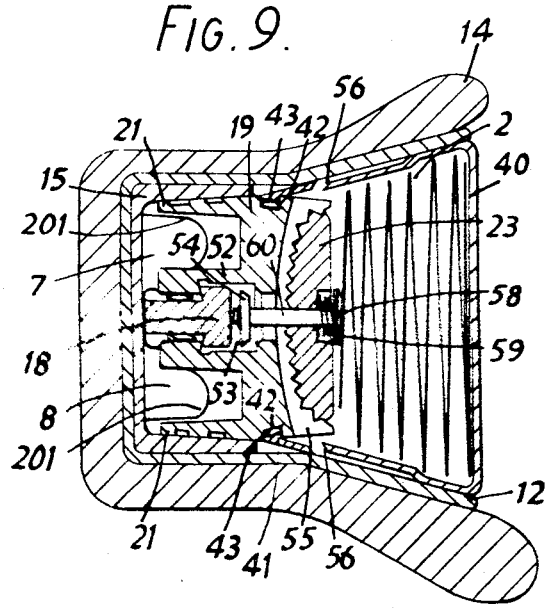

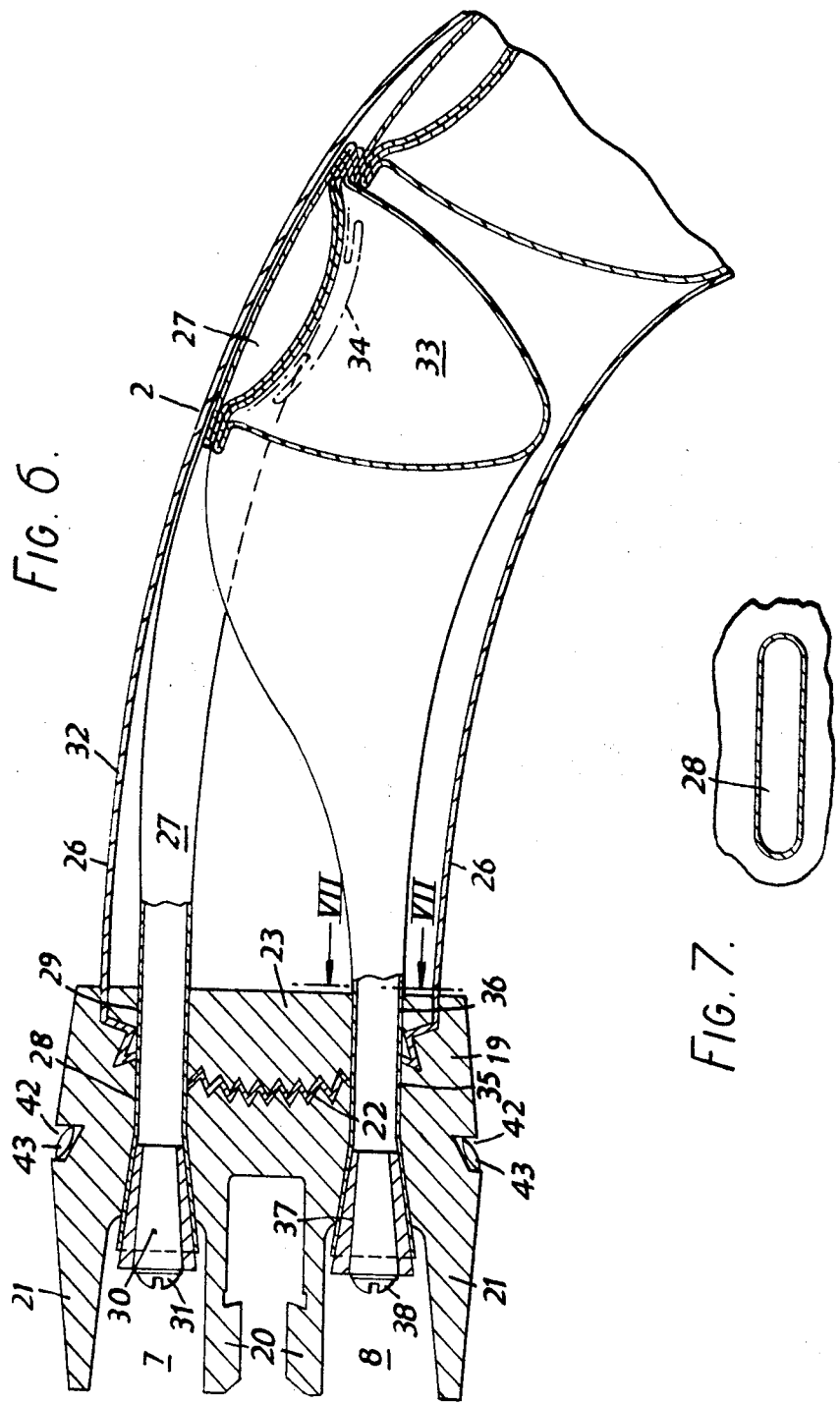

Patented Aug. 21, 1973 3,753,576

6 Sheets-Sheet 4

VEHICLE SAFETY DEVICE

This invention relates to a vehicle safety device to provide injury protection for the occupant or the structure of a wheeled or other vheicle and is based upon the general principle of providing a rapidly produced protective shield which can act to cushion the impact of the structure or the occupant against a colliding object.

According to one aspect of the present invention a vehicle safety device comprises an expandible composite element provided with a mounting for location in a vehicle and which can be expanded from an inoperative retracted position to an operative expanded position and means for rapidly filling the element with a filler material to cause the expansion, the element including an outer shield which expands first and an inner shield which extends inwardly therefrom and expansion of which is commenced after expansion of the first shield has started.

Thus, with this construction the element can be arranged to extend around a passenger to be protected to encapsulate him and the inner shield then expanding inwardly and closely contact him.

Conveniently the safety device may be rigidly secured to a vehicle seat and may include the main structural member part of which extends above the back of the seat and which carries the expandible element.

The main structural member above the seat may provide a safety structure to prevent the vehicle structure from caving in around the seat in the event of damage to it.

With this arrangement the main structural member may be in the form of a hoop from which the element expands forwardly around the seat to a part spherical shape, the inner surface of the inner shield being contoured to approximate to the frontal and side shape of a human body from the head down to the waste level when the element is fully expanded.

The filler material may be gas or a foam solution and the protective compsite element may be constructed from plastic or other fibrous materials or a combination of both.

Preferably means are included for delaying the expansion of the inner shield until the outer shield is at least partially expanded and separate pressure sources may be provided to expand the inner and outer shields.

Preferably the filler material is a gas carried in a capsule or capsules located in the mounting and these capsules may be conveniently carried in a head rest provided in the mounting.

In any case, the outer shield may be made up from a series of tubes to which the inner shield which comprises a series of vesicles is connected.

Means are also preferably provided for releasing the expandible element from its mounting after it has been expanded and means may also be incorporated for operating the release means after a time delay.

The expandible element may be carried by an anchorage member which is releasably secured to attachment means in the mounting and which can be reloaded with a replacement anchorage member and element after the original element has been operated and removed.

In a preferred embodiment the expandible element is located in a housing when in its retracted position, the housing being closed by a removable cap and means may be provided for releasing the cap as the element is expanded.

With this contruction the interior of the housing is preferably pressurised prior to releasing the cap and the pressurisation may be provided by filler material used to expand the outer shield.

The element may be perforated to provide passage for air/light so that when it is in position around the passenger these essentials are provided.

Thus, the element may have light transmitting fibres which extend through it and which are arranged for viewing at a predetermined zone within the element.

In any case, the outer shield may carry reinforcing bands at its edge area and the mounting may carry an impact cushion which is expandible in the opposite direction to the element to provide protection to the element to provide protection for a person behind the safety device.

Preferably a sensor operated by acceleration or deceleration, rate of decent in the case of an aircraft, pressure or heat is provided which actuates a signal generator to cause operation of the device and the sensor may include a piezo crystal which is subjected to mechanical deformation in well known manner.

The single generator can be arranged to actuate a signal interrupter or chopper which performs a time delay in a sequence of signals for activating the operating means and the device may also include a monitor which allows operation of the operating means only at predetermined conditions of vehicle motion so that, for example, the device cannot be operated when the vehicle is stationary.

Means may also be included for preventing operation of the device if there is no occupant With these arrangements therefore a manual operating device could be included which actuated the piezo crystal such as the brake pedal of a motor vehicle and the sensing device could be incorporated in a vehicle speedometer so that the filler means is only actuated at predetermined speeds and brake fluid pressures. In an aircraft the sensing device could be incorporated in a rate of descent meter or in an accelerometer.

Figure 2:
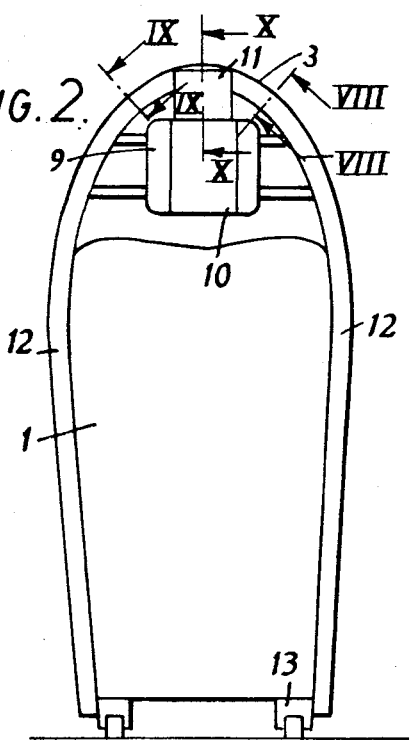
Figure 3:
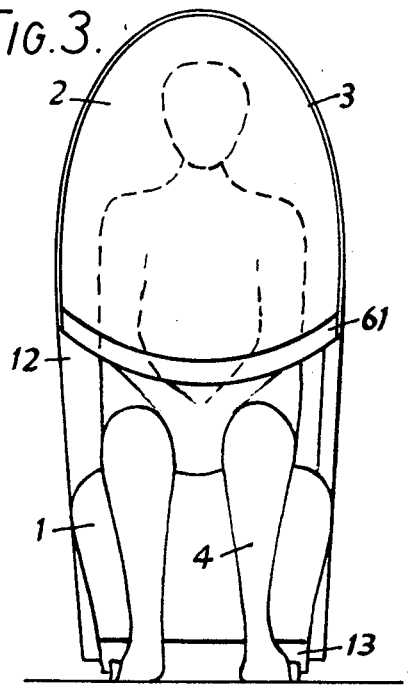
Figure 10:
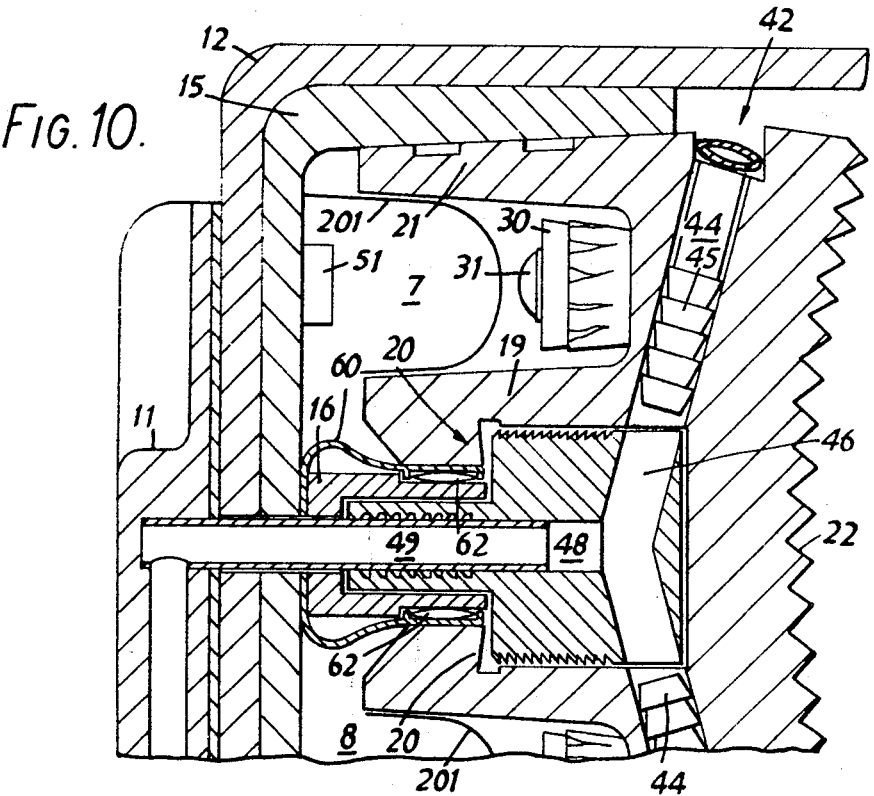
Figure 11:
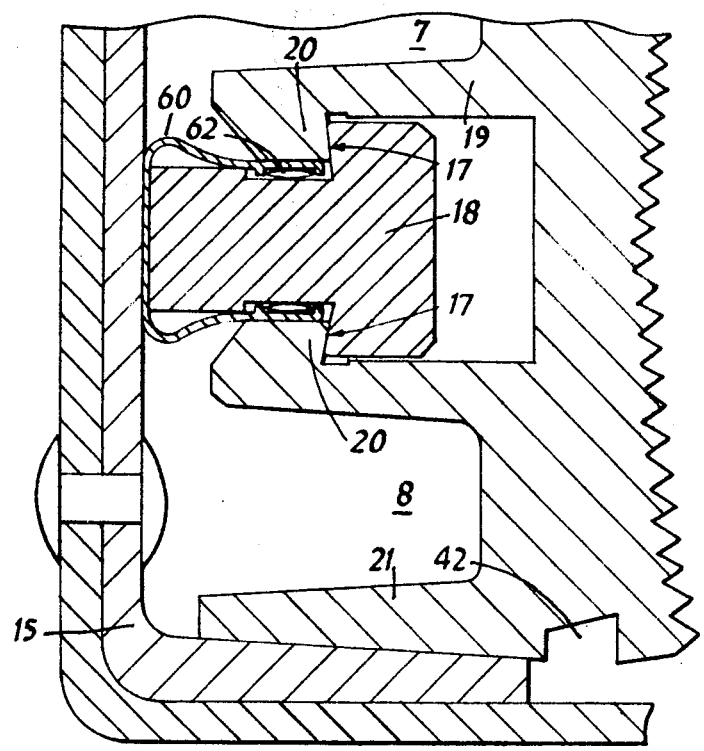
Figure 12:
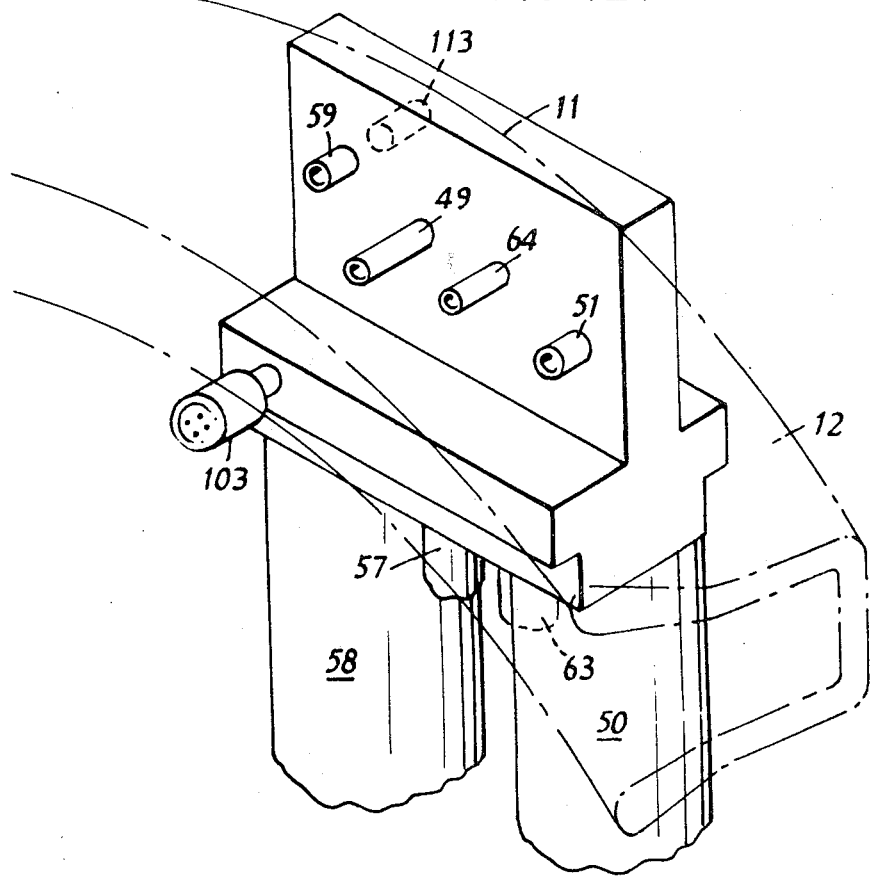
Figure 13:
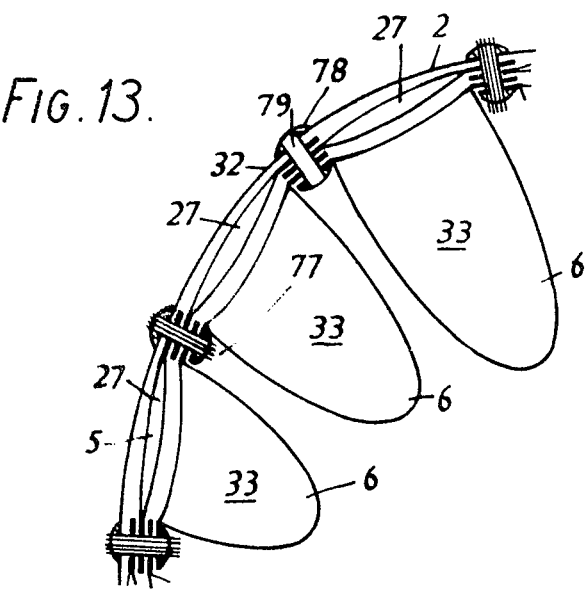
Figure 14:
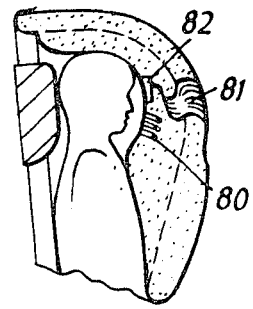
Figure 15:
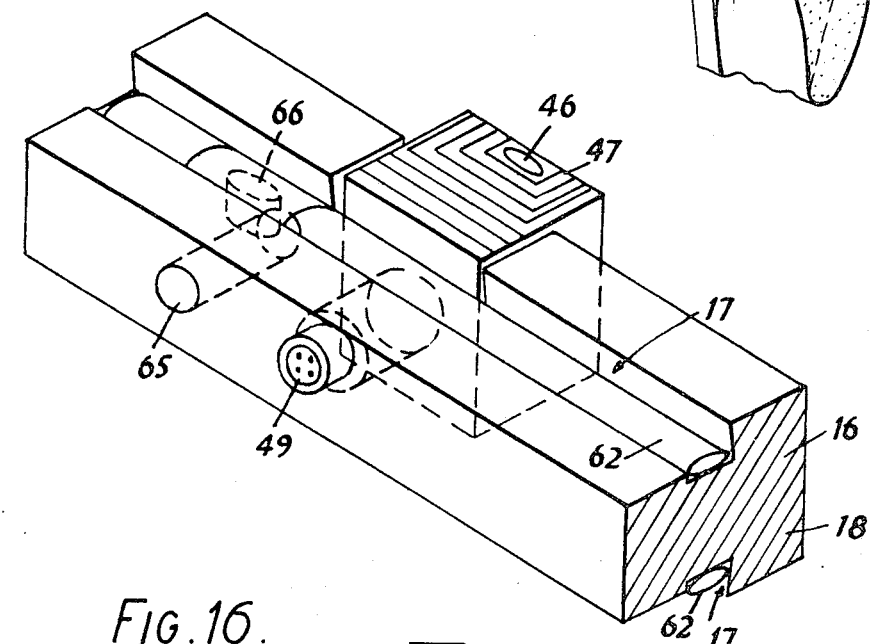
Figure 16:
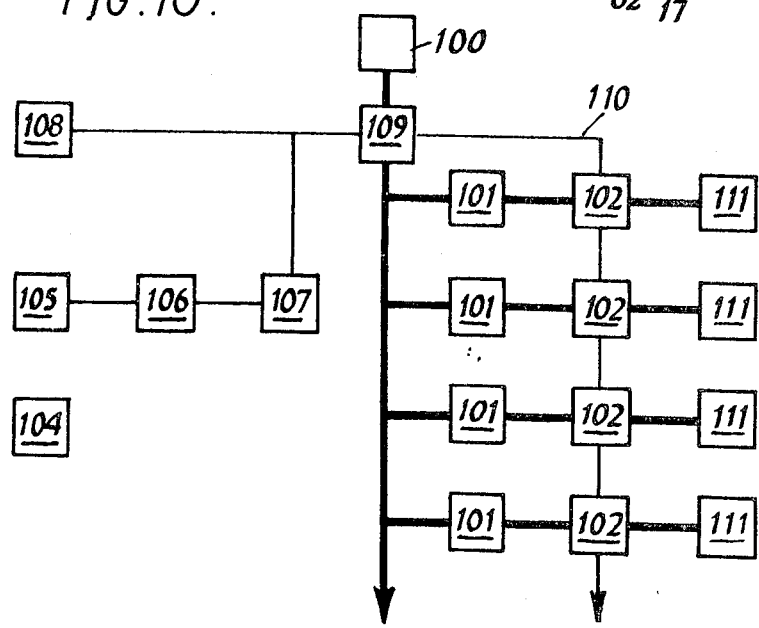

This invention may be performed in various ways and one embodiment as applied to a motor vehicle will now be described by way of example and with reference to the accompanying drawings, in which:

FIG. 1 is a diagrammatic side elevation partly in section of a safety device according to the invention and incorporated in a motor vehicle seat, FIG. 2 is a rear elevation of the seat shown in FIG. 1, FIG. 3 is a front elevation of the same seat, FIG. 4 is a plan view of the seat shown in FIGS. 1 to 3, FIG. 5 is a part section through the line 5—5 in FIG. 1, FIG. 6 is a part cross sectional view on the line 6—6 of FIG. 4, FIG. 7 is a scrap view on the line 7—7 of FIG. 6, FIGS. 8 and 9 are part cross sectional views on the lines 8 and 9 respectively of FIG. 2, FIG. 10 is an enlarged part cross sectional view on the line 10—10 of FIG. 2, FIG. 11 is an enlarged view of part of FIG. 9, FIG. 12 is a fragmentary view of the gas supply manifold, FIG. 13 is a part cross sectional view of the expandible element when expanded, FIG. 14 is a diagrammatic cross sectional view showing the location of air holes and light fibres, FIG. 15 is an isometric view of an intermediate anchorage member, and, FIG. 16 shows the electric operating circuit for the apparatus.

As shown in the drawings the safety device is incorporated in the seat structure of a motor vehicle which is indicated in FIG. 1 by the reference numeral 1.

The principal by which the passenger is to be protected is "encapsulation" in two stages. The primary stage is extremely rapid and consists of a general envelopment of the upper parts of the body by a composite element indicated by reference numeral 2 emanating from a housing indicated generally by reference numeral 3 situated behind the passenger who is indicated in the drawings by reference numeral 4. This housing 3 follows the general line of the body from the waist position on the one side around the head to the waist on the opposite side. The composite element is a tough pliable construction of inner and outer layers. The space between contains ducts, indicated generally by reference numeral 5 (shown in FIG. 5) which are pressurized during operation to open the protective envelope and move it into its operative extended position. These ducts 5 run from distribution channels 7,8 carried within the housing 3 to the extremeties of the element 2. The secondary stage of encapsulation takes place when ducts 6 which are in the form of localised areas on the inside of the protective element expand and closely contact the passenger as is most clearly shown in FIG. 1. As these continue to fill out under pressure the passenger is pushed back into his seat with his body being centralised. Some of the ducts 6 expand inwardly so that they contact the sides of his head and neck and the rear of his head contacts a head rest indicated generally by reference numeral 9. On frontal or sideways impact being subjected to the vehicle in which he is travelling, he will initially move from his seat, only against resistance of the pressurised protective element, subsequently against the resistance to stretch of the material from which the element is constructed.

The pressurising medium may be a gas or a foam solution and in the arrangement being described a gas is used and the protective element may be constructed from plastic, or fibrous material or a combination of both. Certain strengthening material may be contained within the construction of the protective element to limit stretch and resist rupture and part of the protective element may be provided with cellular interiors and locally enlarged, for added safety. The secondary stage of expansion is delayed until the primary stage is partially completely, and uses a separate pressure source working in conjunction with the primary source.

The pressure sources and reservoirs are indicated be reference numeral 10 and are carried in the head rest 9, suitable delivery ducts to the element 2 being provided in a manifold 11 which is to be described.

A hoop shaped main structural member 12 surrounds the seat and is connected to a base 13 to which the seat 1 is also rigidly connected so that adjustment of the seat simultaneously adjusts the main structural member 12. The main structural member 12 is of channel section and its outer surface is covered with protective padding 14 as is most clearly shown in FIGS. 8 and 9. The upper part of the member 12 extends substantially vertically and is provided with a liner channel 15 made from a hard plastics material. Secured to the lower wall of the channel section member 12 is an intermediate anchorage member 16 part of which is most clearly shown in FIG. 15 and which is secured by rivets 17. The intermediate anchorage member 25 is cut back at 17 to provide an enlarged head 18 to which is connected a main anchorage member 19 made from a hard but resilient plastics material. This member 19 extends around the housing in a similar manner to member 16 and is locked onto it by abutments 20 which engage beneath the cutback portions 17 of the member 16, and which are assisted by intensifier springs 201. The side portions 21 of the member 19 engage and seal against the liner channel 15 and the cross sectional shape of the member 19 forms the main part of the gas distributor ducts 7 and 8. The front face of the main anchorage member 19 is provided with a serrated surface 22 against which a plastics material gripper member 23 having a similar surface is clamped by means of screws 24 which engage metal inserts 25 in the gripper member. A series of screws extend throughout the length of the gripper member to provide adequate attachment.

Membrane attachments 26 are provided on the expandible element, enter the interstice between the serrated surfaces where they are firmly clamped into position.

The expandible element 2 comprises inner and outer shields which are operated respectively by the ducts 5 and 6. The outer shield comprises a series of tubes 27 each of which is attached to the anchorage member 21 by passing through flattened openings 28 and 29 in the anchorage member 19 and gripper member 23, the shape of these openings being indicated in FIG. 7. Each tube terminates by being firmly clamped by a tapered form plug 30 which is retained by a screw 31 passing through a lug at each end of each plug, the screws engaging screw threaded holes in the anchorage member 19. There are a number of outer tubes and they are connected to an outer membrane covering 32 which joins them all together and which provides the diaphragm 26 which is gripped by the gripper member 23. This membrane is reinforced with additional layers of similar or other materials. The tubes 27 have attached to them tubes 33 which form the inner shield, these tubes 33 being in the form of vesicles when expanded and which are folded in the manner shown by broken lines 34 in FIG. 6 prior to opening. Each of the tubes 33 passes through openings 35 and 36 in the members 19 and 23, these openings being similar to the openings 28 and 29 but spaced away from them. The ends of the tubes 33 which provide the vesicles 34 are clamped by tapered plugs 37 which are held by screws 38 in a similar manner to the tapered plugs 30 described above. It will be appreciated that the tubes 27 open into the gas ducts 7 and the tubes 33 into the gas duct 8.

Attached to the vesicles 34 at a location near to gripper 32 and the membrane attachments 26 and which also extend between the serrated surfaces, on the members 19 and 23 where they are firmly clamped. Thus, with all the principle elements of the inner and outer shields firmly clamped to the shield anchorage member 19, the operational stresses imparted to the shield are transmitted to the shield anchorage member and through the subsidiary anchorage member 16 to the main structural member 12.

When the device is assembled the expandible element 2 is folded concertina fashion, as shown in FIGS. 8 and 9, into the housing and is held in place by a cap 40, and is made from a suitably rigid plastics material. The inner ends of the cap are provided with rim latches 41 which engage behind the walls of grooves 42 provided in the member 19. The walls of the cover 40 also engage dimples 181 provided on the channel section main structural member 12. Arranged beneath the latches 41 are expandible release bladders 43 to which the gas can be fed through T-junction pieces 44 (see FIG. 10) which extend into passages 45 provided in the member 19. The passages 45 are aligned with passages 46 carried in blocks 47. The blocks 47 each have a bore 48 which locates on a tube 49 extending through the rear wall of the main structural member 12 and passing through the secondary anchorage member 16. The contruction of the blocks 47 is most clearly shown in FIG. 15 and it will be seen that the upper surface of the block is provided with serrations to assist in easy location and to reduce gas escape. If desired the blocks may be cemented into position, the cement being such that it will part and allow the blocks to be removed in a manner to be explained.

The tube 49 extends rearwardly to the manifold 11 and from FIG. 12 it will be seen that the manifold is arranged immediately behind the main support member 12 and carries four gas storage capsules and the delivery pipes for delivering the gas from them to the various parts of the device.

In order to operate the device an electrical impulse is generated, by means to be described, which detonates a small explosive charge (not shown) to rupture a sealing diaphragm (not shown) in the storage capsule 50 indicated in FIG. 12. This storage capsule, which is connected to the manifold 11 passes gas through a delivery nozzle 51 on the manifold 11 to the gas distributor channel 7, the nozzle 53 passing through openings in the wall of the main structural member 12 and in a liner 15. The gas is directed from the channel 7 into the outer shield by passing through the plugs 30 and into the tubes 27. Some of the gas passes through a series of passages 52 to a centre channel 53 formed in the shield anchorage member 19 and through a valve 54 to transverse grooves 55 formed behind the gripper member 23 and into the interior of the cap 40 where it causes a sharp rise in pressure causing a tendency for the cap to eject from the housing. The cap 40 is provided with a number of gas leakage paths 56 which promote pressure equalisation between the inside of the cap and the interface between the cap and its housing.

A second electrical impulse detonates a further small explosive charge to release gas from a small storage capsule 57 on the manifold 11 which gas is directed through the manifold to the gas entry probe 49. The gas relay block 47 transfer the gas to the bladders 42 causing them to inflate and thereby disengage the dimples on the main structural member and rim latches 41. This engagement of the latches from the shield anchorage member allows the cap 40 to be freed and ejection follows instantly due to the raised pressure inside the cap, with friction forces tending to retard ejection minimised due to the air gap produced at the cap and housing interfaces by the openings 56. Due to the form of the cap and the concertina method of folding the stored expandible elements within it the element is carried some distance with the cap as it ejects.

The movement of the folded element away from the housing causes a detection head 58 (see FIG. 9) to move outwards under the influence of a spring 59 and through a valve spindle 60 to close the valve 54 to prevent the further supply of gas through the transverse grooves 55. The full flow of gas from the storage capsule 50 is now directed into the tubes 27 which provide the outer shield. Thus, the outer shield expands out to an eliptical form, as shown in FIG. 1 and to progressively open out the concertina folds in the tubes as expansion progresses along them. This action carries on the initial momentum gained by ejection of the cap 40 and continues until the tubes are all opened-out to the eliptical form. The construction of the tubes and their assembly together results in the shape produced by the expanded and developed tubes this being similar to a part spherical shell that is, with the depth of the eliptical tubes equivalent to the thickness of the shell. As the shape develops the tubes 27 carried with them the outer membrane covering 32 and also the inner tubes 33 which provide the vesicles 34 in unexpanded form and it is only during the time after they have already completed part of their movement with the tubes do they begin to receive a supply of pressurised gas which causes them to expand away from the folded formation indicated by broken lines 34 towards a point that is approximately the centre of the spherical shape of the fully formed shield outer element. The gas required to bring about the unfolding expansion of the inner shield is from a further gas storage capsule 58 again carried on the manifold 11 which transvers the gas through a delivery nozzle 59 which enters the main structural member 12 through an opening and into gas distributor channel 8 serving the inner element. The gas is directed from the channel into the tubes 33 through the tapered wedge fittings 37.

Due to the method of attachment the loads on the shields are transferred to the main structural member 12 through the intermediate anchorage member 16 and the stress of operation are transferred through the abutments 20 which are held in positive engagement by the natural resilience of the shield anchorage member 19 and intensifier springs 201, the engagement being further promoted by inclinations of the abutment surfaces which act to cause "riding up" of the shield anchorage member abutments on the root anchorage abutments and forces tending to separate the two members occur. Should assymmetric arise in operation, where for example, the outer membrane 26 is transferring most of the stresses back to the shield anchorage members, the gas channel outer walls 21 reacting against the main structural member liner 15 to stabilise the shield anchorage member against distortion.

To resist the effects of operational stress which would tend to rupture the shield along its lower level, corresponding the waist level of the seat occupant to which the safety device is fitted, a reinforcing band 61 is provided which tends to give a lap belt effect. These reinforcing bands 61 are also employed to close and pressure seal the tubes in the shields.

After operation release of the shield assembly is effected by the inflation of a set of bladders 62, most clearly shown in FIG. 10 which act through the ends of the springs 60 to disengage the abutments 20 formed on the anchorage member 19 from the member 16. The spring 60 also provides a low friction surface from the shield anchorage member 19 to slide on when the shield anchorage member is withdrawn from the main structural member and out of the liner channel 15. The inflating gas to the bladders 62 is released from the gas storage capsule 63 carried on the manifold 11 by the rupture of a sealing diaphragm caused by the detonation of a small explosive charge fired by an electrical impulse. The gas is directed from the storage capsule through the manifold 11 and is then conducted by a supply probe 64 through an opening in the main structural member 12 to a gallery 65 formed in the root anchorage member 16 (see FIG. 15) into which the bladder terminations enter in the form of tee fittings 66. Shield release is assisted by the gas pressure exhausting in the gas distributor channels, 7, 8 which tend to separate the shield anchorage member 19 from the liner channel 15.

Whilst the shield is in the operational position, the seat occupant to which the safety device is fitted is enabled to see out of the vehicle by means of light transmitting fibres 77 which are arranged in groups to receive light sources within the shield and which project through a member of particular eyelet holes in the shields, these eyelets 78 provide attachment zones for the inner and outer shields and are orientated by the shield when it is in its operative position. Some of the eyelets may be open as shown at 79 to allow the entry of air.

In the arrangement shown in FIG. 14 air holes are indicated by reference numeral 80 and a number of light transmitting fibres 81 are provided which lead to a viewing panel 82 within the shields.

As will be seen from FIG. 1 the various capsules connected to the manifold 11 are located within the head rest 9 and thus, when the apparatus has been operated and the shields released a new operating element can be fitted and made ready for use merely by replacing the capsules and fitting a replacement anchorage member 19. The element is now folded concertina fashion and the cap 40 placed in position.

The electrical impulses which detonate the small explosive charges to rupture the sealing diaphragms of the gas discharge capsules are controlled from a triggering or signalling circuit which is shown diagrammatically in FIG. 15. This circuit senses whether certain predetermined conditions of motion or compounds of different motions together with other conditions of pressure in, say in braking system hydraulic lines, or by direct intervention of a human agency using specific control. As will be seen the circuit comprises a source of electrical power 100 which can be derived from the vehicle power supply the electrical power source passing to each of four seating positions in the vehicle. From these detectors 101 the power supply passes to a series of sequence controllers 102 and then to the cartridges on the gas storage capsules. From FIG. 12 it will be seen that an electrical supply socket 103 is carried on the manifold 11, suitable wiring being provided. A sensor which is sensitive to acceleration, deceleration, rate of descent in the case of an aircraft, and electrical impulse which can be operated from a manual control or a sensor operated by heat is indicated at 104. This sensor may contain a piezo electric crystal operated in known fashion and which can be arranged to be operated by, for example, a motor vehicle brake control. This sensor is connected to a signal generator 105 a signal from which passes to a signal amplifier 106 and a monitor 107. The monitor 107 is a simple electrical device which is arranged to keep the circuit inoperative unless certain predetermined conditions are in operation. For example, in a motor vehicle the device could be arranged to be non-operative unless the vehicle is moving beyond a certain speed thus preventing inadvertent operation of the safety devices if the vehicle was stationary.

A discretionary control 108 is also provided which can be manually operated to fire the devices and it will be seen that this can override all the other controls apart from the vehicle seat occupancy detectors 101. The signals pass to a relay 109 and then to a line 110 to the sequence controllers 102. The sequence controllers may be of any convenient form well known in electrical applications, for example a condenser, so that they issue a series of sequential pulses which are passed to the cartridges, indicated by reference numerals 111. The gap between each pulse can be determined by experiment and will be in the region of one tenth of a second.

It will be appreciated that the control system set out above is only typical of many which can be used with the device.

As will be seen from FIG. 1 the rear of the head rest is also provided with an expandible element indicated by reference numeral 112. This element is also arranged to operate simultaneously with the shields to provide protection for any passenger behind the seat carrying the safety device. This element 112 can be operated by gas from the storage capsule 58 through a rearwardly extending probe 13 on the manifold 11 or from a further capsule connected to the probe 113.

I claim:

1. A vehicle safety device comprising an expandible composite element, mounting means for mounting said element in a vehicle in an inoperative retracted position relative to an occupant seat, said element including an expansible and projectable outer shield carried by said mounting means for projection therefrom, means connected to said outer shield for expanding said outer shield and projecting said outer shield to a shielding position in spaced relation to an occupant seat to provide for a initial shielding of an occupant, said element also including an inner shield carried by said outer shield for projection therefrom, and means for expanding said inner shield relative to said outer shield towards an occupant seat after expansion of said outer shield has been initiated to provide for a further shielding of an occupant.

2. A vehicle safety device as claimed in claim 1 in which the element is arranged to extend around an occupant to be protected to encapsulate him, the inner shield expanding inwardly to closely contact him.

3. A vehicle safety device as claimed in claim 2 wherein said mounting means is rigidly secured to a vehicle seat.

4. A vehicle safety device as claimed in claim 3, said mounting means including a main structural member part of which extends above the back of the seat and which carries the expandible element.

5. A vehicle safety device as claimed in claim 4 in which the main structural member above the seat provides a safety structure for preventing the vehicle structure caving in around the seat.

6. A vehicle safety device as claimed in claim 5 in which the main structural member is in the form of a hoop and from which the element expands forwardly around the seat to a part spherical shape, the inner surface of the inner shield being contoured to approximate to the frontal and side shape of a human body from the head down to waist level when the element is fully expanded.

7. A vehicle safety device as claimed in claim 1 in which the fill material is a foam solution.

8. A vehicle safety device as claimed in claim 1 including means for delaying expansion of the inner shield until the outer shield is at least partially expanded.

9. A vehicle safety device as claimed in claim 1 in which the means for expanding the inner and outer shields include a separate pressure source for each of said shields.

10. A vehicle safety device as claimed in claim 9 in which the filler material is a gas carried in at least one capsule located in the mounting means.

11. A vehicle safety device as claimed in claim 10 in which said mounting means include a head rest, and the capsule is carried in said head rest.

12. A vehicle safety device as claimed in claim 1 in which the outer shield is made up from a series of tubes to which the inner shield which comprises a series of vesicles is connected.

13. A vehicle safety device as claimed in claim 1 including means for releasing the expandible element from said mounting means after it has been expanded.

14. A vehicle safety device as claimed in claim 13 including means for operating the release means after a time delay.

15. A vehicle safety device as claimed in claim 1 in which said mounting means includes a releaseable anchorage member carrying the expandible element, and said mounting means being reloadable with a replacement anchorage member and element after the original element has been operated and removed.

16. A vehicle safety device as claimed in claim 1 in which said mounting means includes a housing receiving the expandible element when in its retracted position, the housing being closed by a removeable cap, and means for pressurizing the interior of the housing prior to release of the cap.

17. A vehicle safety device as claimed in claim 16 in which the housing is pressurised by filler material used to expand the outer shield.

18. A vehicle safety device as claimed in claim 1 in which the outer shield has free edge areas and carries reinforcing bands at said edge areas.

19. A vehicle safety device as claimed in claim 1 in which the mounting means carries an impact cushion which is expandable in the opposite direction to the projection of the element to provide protection for a person behind the safety device.

20. A vehicle safety device as claimed in claim 1 in which the safety device includes a sensor for effecting operation of the device, the sensor including a piezo crystal which is subjected to mechanical deformation.

21. A vehicle safety device as claimed in claim 1 in which the safety device includes a sensor for actuating a signal generator to effect operation of the device, and wherein the signal generator actuates a signal interrupter or chopper which performs a time delay in a sequence of signals for activating the operating means.

22. A vehicle safety device as claimed in claim 21 including a monitor which allows actuation of the device only at predetermined conditions of vehicle motion.

* * * * *

UNITED STATES PATENT OFFICE
CERTIFICATE OF CORRECTION

Patent No. 3,753,576  Dated August 21, 1973

Inventor(s) John F. Gorman

It is certified that error appears in the above-identified patent and that said Letters Patent are hereby corrected as shown below:

In the heading, insert the following:

Foreign Application Priority Data

Sept. 29, 1970  Great Britain  46,294/70

Signed and sealed this 19th day of March 1974.

(SEAL)
Attest:

EDWARD M. FLETCHER, JR.
Attesting Officer

C. MARSHALL DANN
Commissioner of Patents